(12) United States Patent
Lee

(10) Patent No.: US 8,954,692 B2
(45) Date of Patent: *Feb. 10, 2015

(54) FILE PROTECTING METHOD AND SYSTEM, AND MEMORY CONTROLLER AND MEMORY STORAGE APPARATUS THEREOF

(75) Inventor: Chien-Fu Lee, Yunlin County (TW)

(73) Assignee: Phison Electronics Corp., Miaoli (TW)

( * ) Notice: Subject to any disclaimer, the term of this patent is extended or adjusted under 35 U.S.C. 154(b) by 260 days.

This patent is subject to a terminal disclaimer.

(21) Appl. No.: 13/551,594

(22) Filed: Jul. 17, 2012

(65) Prior Publication Data

US 2013/0311708 A1 Nov. 21, 2013

(30) Foreign Application Priority Data

May 18, 2012 (TW) .............................. 101117788 A

(51) Int. Cl.
*G06F 13/00* (2006.01)
(52) U.S. Cl.
USPC ............. 711/159; 711/103; 711/162; 710/40; 710/200; 713/152; 713/179; 713/185; 714/30
(58) Field of Classification Search
CPC ..... G06F 3/0601; G06F 3/0614; G06F 3/062; G06F 3/0688; G06F 11/1469; G06F 12/0238; G06F 12/1425

USPC .................... 711/103, 159, 162; 710/40, 200; 714/30; 713/152, 179, 185
See application file for complete search history.

(56) References Cited

U.S. PATENT DOCUMENTS

| 7,702,831 B2* | 4/2010 | Ma et al. .......................... 710/74 |
| 8,291,155 B2* | 10/2012 | Lai et al. ....................... 711/103 |
| 8,312,554 B2* | 11/2012 | Wang et al. ..................... 726/26 |
| 2002/0178162 A1* | 11/2002 | Ulrich et al. .................... 707/10 |
| 2003/0115414 A1* | 6/2003 | Tomita .......................... 711/114 |
| 2012/0030411 A1* | 2/2012 | Wang et al. ................... 711/103 |
| 2013/0185479 A1* | 7/2013 | Lin ............................... 711/103 |

* cited by examiner

*Primary Examiner* — Reba I. Elmore
(74) *Attorney, Agent, or Firm* — Jianq Chyun IP Office

(57) ABSTRACT

A file protecting method and system and a memory controller and a memory storage apparatus using the same are provided. The file protecting method includes performing a file protection enabling procedure for a file to generate an entry value backup according to at least one entry value corresponding to at least one cluster storing the file, which is recorded in a file allocation document, store the entry value backup in a secure storage area and change the entry value corresponding to the cluster storing the file in the file allocation document, wherein the file cannot be read according to the changed entry value. Accordingly, the file stored in the memory storage apparatus the can be effectively protected from being accessed by an un-authorized person.

26 Claims, 13 Drawing Sheets

| 700(M) | F8hFFhFFh0Fh | FFhFFhFFh0Fh | FFFFFFFh | 0000000h | 0000000h | 0000000h | 0000000h | ... | 0000000h |
|---|---|---|---|---|---|---|---|---|---|

0th entry value, 1st entry value, 2nd entry value, 3rd entry value, 4th entry value, 5th entry value, 6th entry value, 7th entry value, 127th entry value

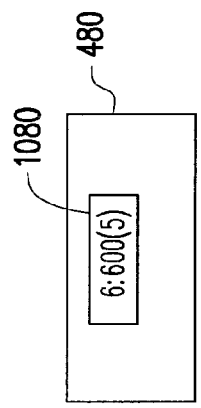

FILE PROTECTING METHOD AND SYSTEM, AND MEMORY CONTROLLER AND MEMORY STORAGE APPARATUS THEREOF

CROSS-REFERENCE TO RELATED APPLICATION

This application claims the priority benefit of Taiwan application serial no. 101117788, filed on May 18, 2012. The entirety of the above-mentioned patent application is hereby incorporated by reference herein and made a part of this specification.

BACKGROUND

1. Technology Field

The present invention relates to a file protecting method and a file protecting system. Particularly, the present invention is related to a file protecting method and a file protecting system for protecting a file stored in a rewritable non-volatile memory module and a memory controller and a memory storage apparatus using the same.

2. Description of Related Art

Digital cameras, cell phones, and MP3 players have undergone rapid growth in recent years, so that consumer demands for storage media have also rapidly increased. A rewritable non-volatile memory has characteristics such as data non-volatility, low power consumption, small volume, and non-mechanical structure, etc., and thus, it is suitable for potable applications and further becomes one of the most adaptable memories for such battery-powered portable products. A flash drive is a storage apparatus using a NAND-type flash memory as its storage medium. Due to its small volume and large capacity, flash drive has been broadly adopted for exchanging data.

For example, users borrow the flash drives from each other to store data to be transmitted to the opposite side in his or her flash drive. However, the flash drive is a quite personal belonging, and important personal data is usually stored therein. Accordingly, when the user borrows the flash drive to another person, how to prevent other persons to view or access personal files originally stored therein is a major concern to the user.

SUMMARY

The present invention is directed to a file protecting method, a file protecting system, and a memory controller and a memory storage apparatus using the same, which are capable of effectively protect a file from being accessed by an unauthorized user.

According to an exemplary embodiment of the present invention, a file protecting method for a memory storage apparatus is provided. The memory storage apparatus has a rewritable non-volatile memory module having a plurality of physical blocks. The file protecting method includes grouping the physical blocks into at least a data area and a spare area, configuring a plurality of logical addresses and grouping the logical addresses into a plurality of logical blocks for mapping to the physical blocks of the data area, wherein the logical addresses are formatted to be a partition including a file allocation document area and a file area, the file allocation document area stores a file allocation document, a file is stored in at least one cluster of the file area, and the file allocation document records at least one entry value corresponding to at least one cluster storing the file. The file protecting method also includes performing a file protection enabling procedure for the file. Herein, the file protection enabling procedure includes generating an entry value backup according to the entry value corresponding to the cluster storing the file, which is recorded in the file allocation document, storing the entry value backup in a secure storage area and changing the entry value corresponding to the cluster storing the file in the file allocation document, wherein the file cannot be correctly read according to the changed entry value.

According to en exemplary embodiment of the present invention, a memory controller for controlling a rewritable non-volatile memory module having a plurality of physical blocks is provided. The memory controller includes a host interface, a memory interface and a memory management circuit. The host interface is configured to be coupled to a host system. The memory interface is configured to be coupled to the rewritable nonvolatile memory module. The memory management circuit is coupled to the host interface and the memory interface. Here, the memory management circuit is configured to group the physical blocks into at least a data area and a spare area, configure a plurality of logical addresses and group the logical addresses to a plurality of logical blocks for mapping to the physical blocks of the data area, wherein the logical addresses are formatted to be a partition including a file allocation document area and a file area, the file allocation document area stores a file allocation document, a file is stored in at least one cluster of the file area, and the file allocation document records at least one entry value corresponding to at least one cluster storing the file. In addition, the memory management circuit is configured to perform a file protection enabling procedure for the file so as to generate an entry value backup according to the entry value corresponding to the at least one cluster storing the file, which is recorded in the file allocation document, store the entry value backup in secure storage area and change the entry value corresponding to the cluster storing the file in the file allocation document, wherein the file cannot be correctly read according to the changed entry value.

According to an exemplary embodiment of the present invention, a memory storage apparatus is provided. The memory storage apparatus includes a connector, a rewritable nonvolatile memory module and a memory controller. The connector is configured to be coupled to a host system. The rewritable nonvolatile memory module has a plurality of physical blocks. The memory controller is coupled to the connector and the rewritable non-volatile memory module. Here, the memory controller is configured to group the physical blocks into at least a data area and a spare area, configure a plurality of logical addresses and group the logical addresses to a plurality of logical blocks for mapping to the physical blocks of the data area, wherein the logical addresses are formatted to be a partition including a file allocation document area and a file area, the file allocation document area stores a file allocation document, and a file is stored in at least one cluster of the file area, and the file allocation document records at least one entry value corresponding to at least one cluster storing the file. In addition, the memory controller is configured to perform a file protection enabling procedure for the file so as to generate an entry value backup according to the entry value corresponding to the at least one cluster storing the file, which is recorded in the file allocation document, store the entry value backup in secure storage area and change the entry value corresponding to the cluster storing the file in the file allocation document, wherein the file cannot be correctly read according to the changed entry value.

According to an exemplary embodiment of the present invention, a file protecting system is provided. The file protecting system includes a memory storage apparatus and a file protecting application. The memory storage apparatus has a rewritable non-volatile memory module and a memory controller. The rewritable non-volatile memory module has a plurality of physical blocks. The memory controller is configured to group the physical blocks into at least a data area, a spare area and a hidden area, configure a plurality of logical addresses and group the logical addresses into a plurality of logical blocks for mapping to the physical blocks of the data area, wherein the logical addresses are formatted to be a partition including a file allocation document area and a file area, the file allocation document area is configured to store a file allocation document, a file is stored in at least one cluster of the file area, the file allocation document records at least one entry value corresponding to the cluster storing the file. The file protecting application is operated in a host system and performs a file protection enabling procedure for the file so as to generate an entry value backup according to the entry value corresponding to the at least one cluster storing the file, which is recorded in the file allocation document, stores the entry value backup in secure storage area and changes the entry value corresponding to the cluster storing the file in the file allocation document, wherein the file cannot be correctly read according to the changed entry value.

Based on the above, in the file protecting method, the file protecting system, and the memory controller and the memory storage apparatus using the same, the stored file can be effectively protected from being accessed by an unauthorized user so that the security of the stored file can be ensured.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 5 illustrates an example of a file allocation document area according to an exemplary embodiment.

FIG. 10A and FIG. 10B illustrate still another example of modifying a file allocation document according to an exemplary embodiment of the present invention.

DESCRIPTION OF EMBODIMENTS

Figure 1A:
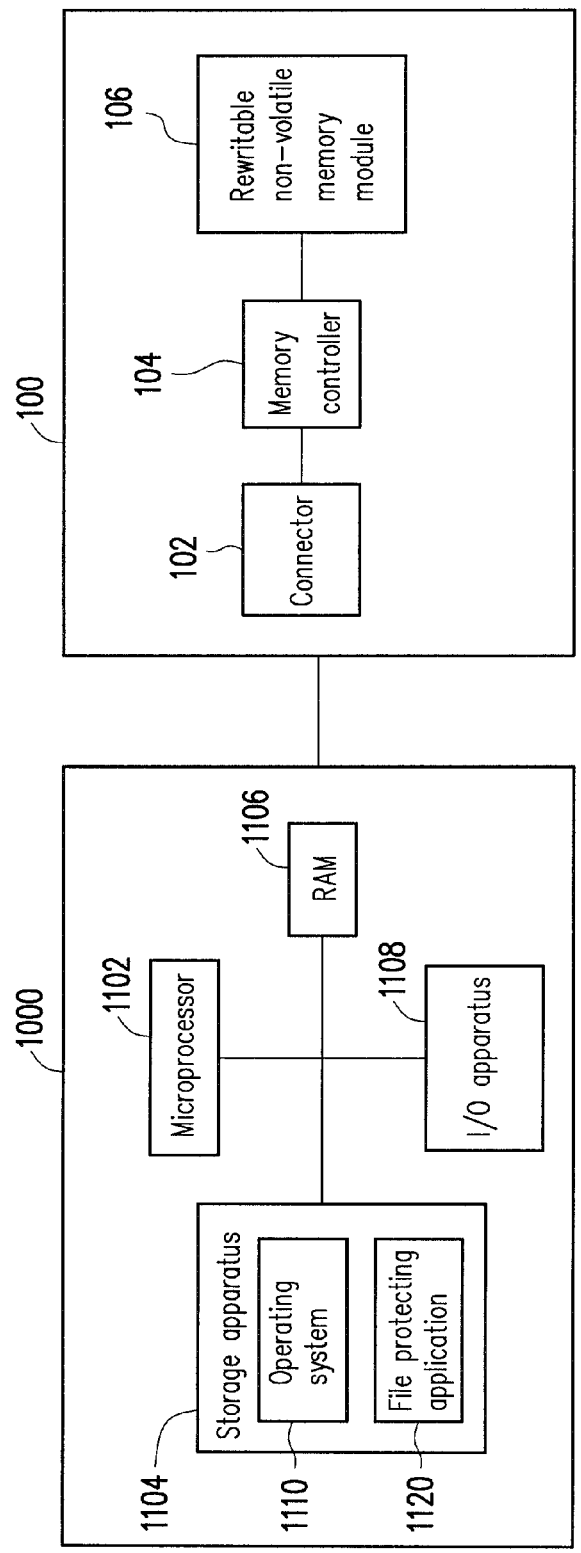
FIG. 1A is a schematic block diagram of a host system and a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a schematic block diagram of a host system and a memory storage apparatus according to an exemplary embodiment of the present invention.

Referring to FIG. 1A, a host system 1000 includes a microprocessor 1102, a storage apparatus 1104, a random access memory (RAM) 1106, and an input/output (I/O) apparatus 1108. When the host system 1000 is boot up, the microprocessor 1102 executes an operating system (OS) 1110 installed in the storage apparatus 1104, so that the host system 1000 can provide corresponding functions according to a user's operations. For example, in the present exemplary embodiment, the host system 1000 is a computer system, the OS 1110 is a Windows OS, and after the host system 1000 is boot up, the user can operate the host system 1000 through the I/O apparatus 1108 so as to perform various functions, such as editing text files, editing audio/video files, and playing audio/video.

Figure 1B:
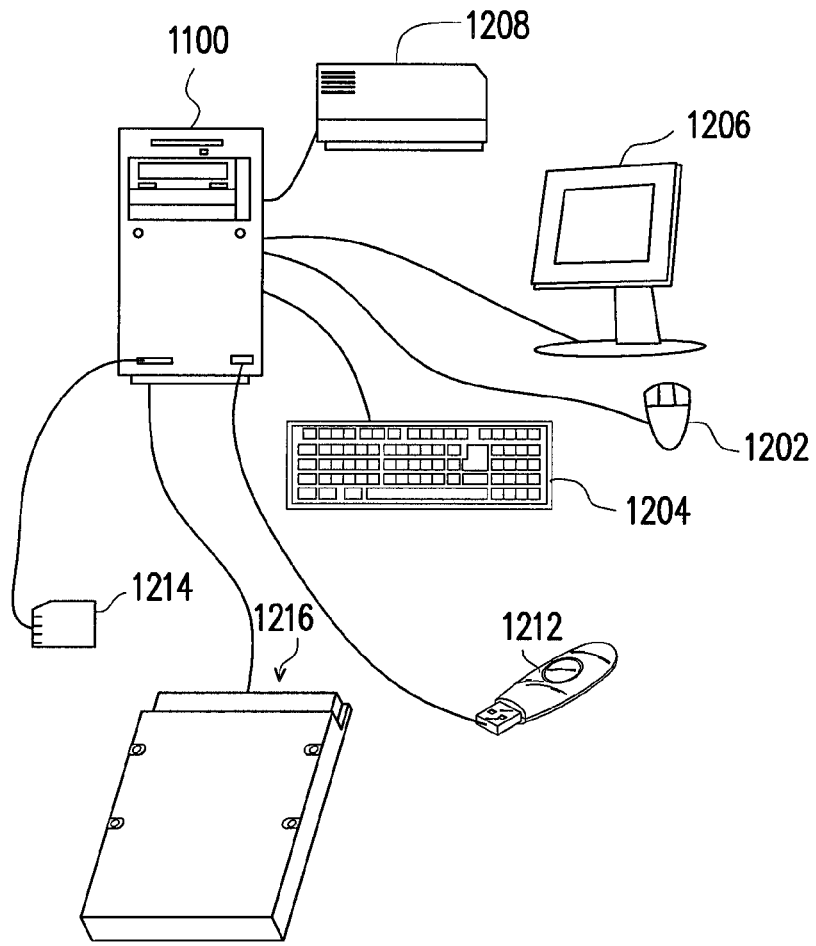
FIG. 1B is a schematic diagram illustrating a computer, an input/output (I/O) device and a memory storage apparatus according to a first exemplary embodiment of the present invention.

A memory storage apparatus 100 is coupled to the host system 1000 and executes data reading and writing operations according to instructions given by the OS 1110 of the host system 1000. For example, the memory storage apparatus 100 may be a rewritable non-volatile memory storage apparatus, such as a flash drive 1212, a memory card 1214, or a solid state drive (SSD) 1216 illustrated in FIG. 1B.

Figure 1C:
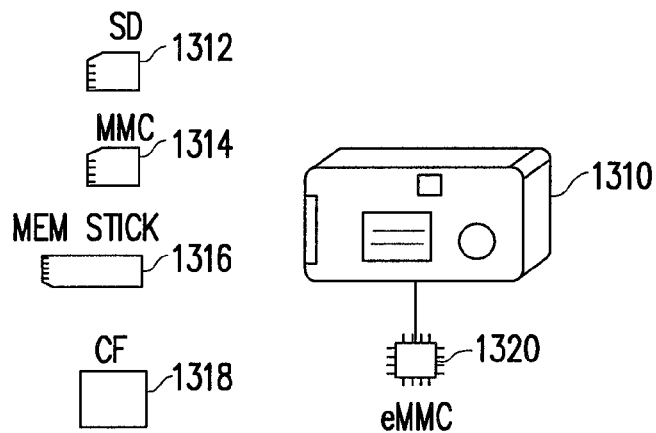
FIG. 1C is a schematic diagram illustrating a host system and a memory storage apparatus according to another exemplary embodiment of the present invention.

Even though the host system 1000 is described as a computer system in the present exemplary embodiment, in another exemplary embodiment of the present invention, the host system 1000 may also be a system, such as a digital camera, a video camera, a communication apparatus, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

The memory storage apparatus 100 includes a connector 102, a memory controller 104, and a rewritable non-volatile memory module 106.

The connector 102 is a type of connector complying with the universal serial bus (USB) standard. However, it should be noted that the invention is not limited thereto, and the connector 102 may also comply with the MS standard, the MMC standard, the CF standard, the Institute of Electrical and Electronic Engineers (IEEE) 1394 standard, the peripheral component interconnect (PCI) standard, the serial advanced technology attachment (SATA) standard, the parallel advanced technology attachment (PATA) standard, the SD standard, the integrated device electronics (IDE) standard, or any other suitable standard.

The memory controller 104 is configured to execute a plurality of logic gates or control instructions implemented in a hardware form or a firmware form and perform various data operations on the rewritable non-volatile memory module 106 according to instructions given by the host system 1000, such as data writing, data reading and data erasing. In particular, the memory controller 104 can perform a file protection enabling procedure according to the present exemplary embodiment in response to a file protection enabling signal transmitted by a file protecting application 1120 operated in the host system 1000 so as to prevent the host system 1000 to access a file under protection. In addition, the memory controller 104 can perform a file protection disabling procedure according to the present embodiment in response to a file protection disabling signal transmitted by the file protecting application 1120 operated in the host system 1000 so as to allow the host system 1000 to access the file that is previously protected. Later on, the file protection enabling procedure and the file protection disabling procedure will be described in detail with reference to accompanying drawings.

The rewritable non-volatile memory module 106 is coupled to the memory controller 104 and configured to store data written by the host system 1000. The rewritable non-volatile memory module 106 includes a plurality of physical blocks. Each of the physical blocks has a plurality of physical pages, wherein the physical pages belonging to the same physical block can be individually written and simultaneously erased. In detail, a physical block is the smallest unit for erasing data. Namely, each physical block contains the least number of memory cells to be erased all together. A physical page is the smallest unit for programming data. Namely, a physical page is the smallest unit for writing data. However, it should be noted that in another exemplary embodiment of the present invention, the smallest unit for writing data may also be a sector or another size. In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, a triple level cell (TLC) NAND flash memory module, any other flash memory module, or any other memory module having the same characteristics.

Figure 2:
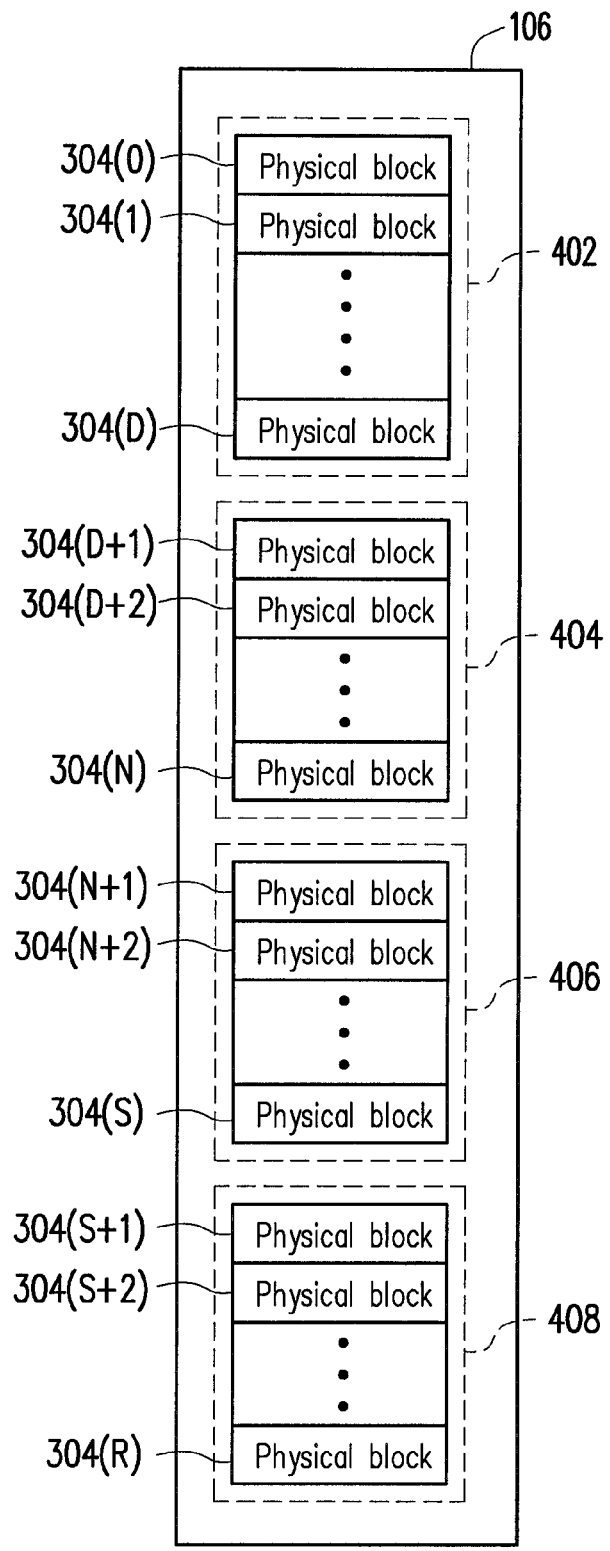
FIG. 2 and FIG. 3 are schematic diagrams illustrating the management of physical blocks.
Figure 3:
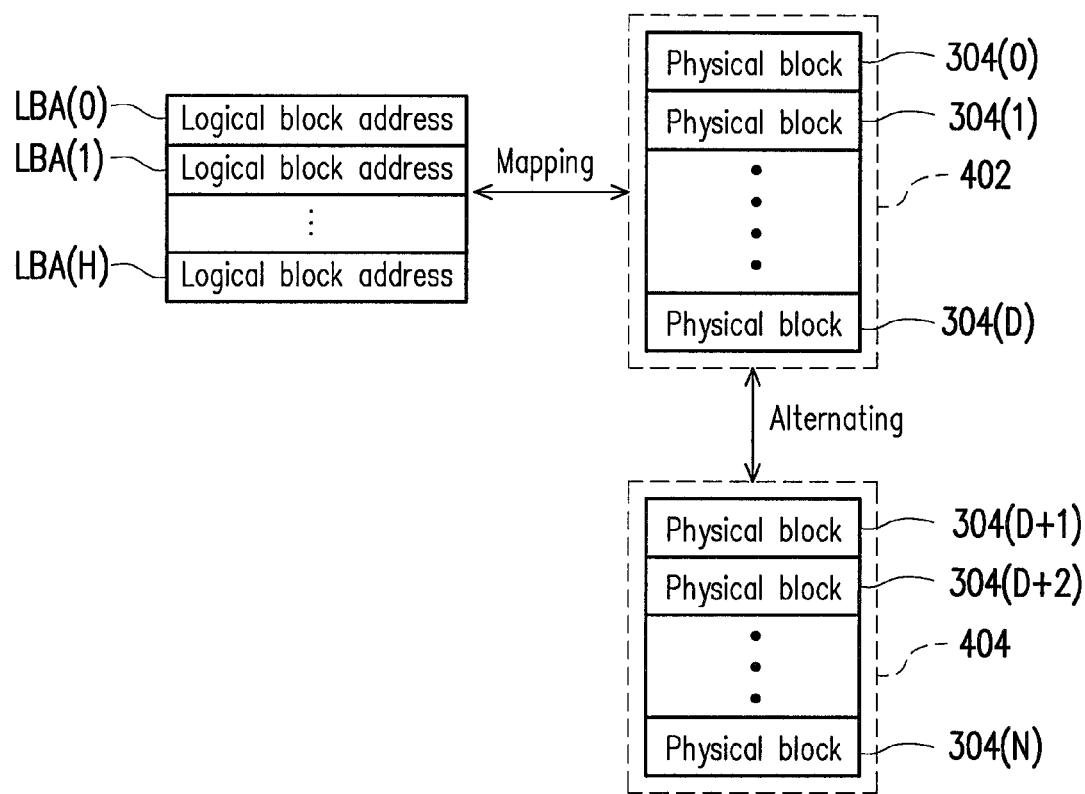

FIG. 2 and FIG. 3 are schematic diagrams illustrating the management of physical blocks.

Referring to FIG. 2, in the present exemplary embodiment, the memory controller 104 logically groups physical blocks 304(0)-304(R) of the rewritable non-volatile memory module 106 into a data area 402, a spare area 404, a replacement area 406, and a hidden area 408. The physical blocks that are grouped into the data area 402 and the spare area 404 are alternatively used for storing data written by the host system 1000. The physical blocks of the replacement area 406 are used for replacing bad blocks in the data area 402 and the spare area 404. The physical blocks of the hidden area 408 are used for storing system data used by the memory controller 104. Specially, the host system 1000 cannot access the hidden area 408.

Referring to FIG. 3, in order to allow the host system 1000 to conveniently access the physical blocks that are alternatively used for storing data, the memory controller 104 configures logical block addresses LBA(0)-LBA(H) to be mapped to the physical blocks of the data area 402, such that the host system 1000 can directly write and read data according to the logical block addresses.

Figure 4:
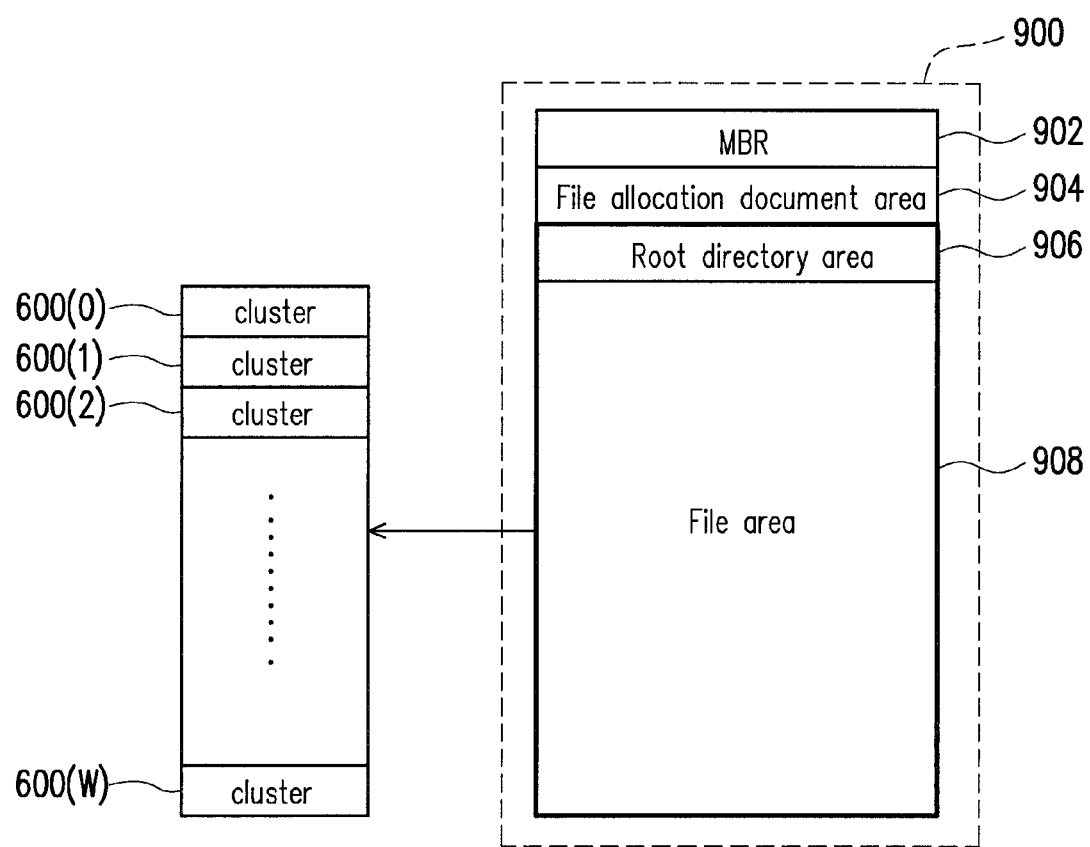
FIG. 4 illustrates an example of logical bock addresses of a memory module formatted by a file system according to an exemplary embodiment.

In the present exemplary embodiment, the logical block addresses LBA(0)-LBA(H) are formatted to a partition 900 according to a file system (as shown in FIG. 4). The file system may be a file allocation table (FAT), a new technology file system (NTFS), a high performance file system (HPFS) or other types of file management systems. For convenience, the present exemplary embodiment is described based on the FAT.

The partition 900 includes a master boot record (MBR) 902, a file allocation document area 904, a root directory area 906, and a file area 908.

The logical block addresses belonging to the MBR 902 are used for storing system information of the storage space of the memory storage apparatus 100.

The logical block addresses belonging to the file allocation document area 904 are used for storing file allocation documents. A file allocation document is configured for recording an entry value corresponding to the logical block address used for storing data. For example, two file allocation documents are stored in the file allocation document area 904, and one of the file allocation documents is used for normal access, while the other is used for a backup file configuration document.

The logical block addresses belonging to the root directory area 906 are used for storing file description block (FDBs), which are configured for recording attribute information of files and directories currently stored in the memory storage apparatus 100. For example, a FDB corresponding to a file is configured to record a file name used for the file and an initial logical block address (i.e. an start cluster) storing the file, and a FDS corresponding to a directory is configured to record a name of the directory and a logical block address (i.e. a cluster) storing the FDB corresponding to the file or the directory stored in the directory.

The logical block addresses belonging to the file area 908 are grouped into a plurality of clusters and are used for actually storing file contents.

To be specific, in a disk, the smallest storage unit is one sector and each sector can store 512 bytes of data. However, when storing data in unit of each sector, the performance of the host system 1000 would be not well. In general, the operating system 1200 of the host system 1000 would not take each sector as a unit of accessing data, but takes each cluster as a basic file unit. Each cluster is constructed with $2^n$ sectors.

For example, if one cluster is constructed of 8 continuous sectors, then the size of the cluster is 4096 bytes. Accordingly, the OS 1110 writes or reads data with 8 continuous sectors to enhance the efficiency of accessing data. However, the size of one cluster is not the larger the better. Because one cluster is the larger, the wasted storage spaces will be more. For example, when the size of one cluster is 4 kilobytes (KB) and the size of a file stored by the host system 1000 just is 1 KB, the file still occupies one cluster and other storage spaces of the cluster would be wasted. In particular, the total of clusters configured in the portable memory storage apparatus 100 is limited based on the capacity of the rewritable non-volatile memory module 106 and the type of FAT. Taking FAT 16 as an example, the maximum number of clusters must be within 4048~65526 according the design of FAT16. Therefore, when a memory storage apparatus having 128 megabytes (MB) of storage spaces is formatted by FAT 16, each cluster must be constructed with at least 4 sectors, otherwise the number of clusters in the memory storage apparatus will exceed 65526 (i.e., 127901/512/4=62452). So, the size of each cluster is 2 KB. Similarly, according to the design of FAT 32, the maximum number of clusters must be within 65526~4177918. It should be noted that according to the design of FAT 16, the size of the root directory area 906 is fixed. But, according to the design of FAT 32, the root directory area 906 is configured in the file area 908 for managing together.

For example, in the present exemplary embodiment, the partition 900 is a partition complied with the standards of FAT 32. Therefore, the sectors belonging to the root directory area 906 and the file area 908 are grouped into clusters 600(0)~600(W). Herein, it is assumed that the cluster 600(0) is configured as a start cluster of the root directory area 906. Moreover, the file allocation table area 904 includes the sectors 700(M)~700(M+K) (As shown in the FIG. 5) for recording the entry values corresponding to the clusters 600(0)~600(W). Herein, the entry values are used for indicating the status of the corresponding clusters. For example, according the design of FAT32, "0000000h" represents the cluster as an idle logical block address (i.e. no data stored therein), "FFFFFFF7h" represents the clusters as a damaged logical block address (i.e. unavailable for storing data) and "FFFFFFF8h"—"FFFFFFFFh" represents the cluster as the last logical block address for storing data. Herein, the first two entry values of the sector 700(M) are saved and recorded as "F8hFFhFFh0Fh" and "FFhFFhFFh0Fh"; the second entry value is corresponding to the cluster 600(0) of the root directory area 906; the third entry value is corresponding to the cluster 600(1). The fourth entry value is corresponding to the cluster 600(2); the fifth entry value is corresponding to the cluster 600(3); the sixth entry value is corresponding to the cluster 600(4); the seventh entry value is corresponding to the cluster 600(5) and so on. Therefore, the entry values corresponding to the clusters 600(0)~600(W) are recorded in the sectors of the file allocation table area 904.

Figure 6:
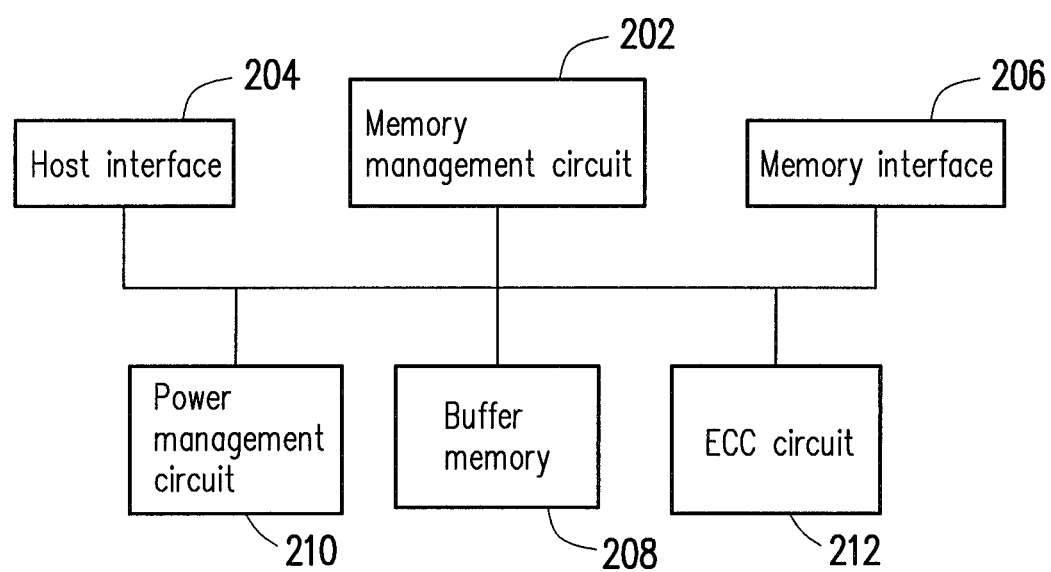
FIG. 6 is a schematic block diagram illustrating a memory controller according to an exemplary embodiment.

FIG. 6 is a schematic block diagram illustrating a memory controller according to an exemplary embodiment.

Referring to 6, a memory controller 104 includes a memory management circuit 202, a host interface 204, a memory interface 206, a buffer memory 208, a power management circuit 210, and an error checking and correcting (ECC) circuit 212.

The memory management circuit 202 is configured to control the overall operation of the memory controller 104. To be specific, the memory management circuit 202 has a plurality of control instructions, and when the memory storage apparatus 100 is powered on, the control instructions are executed to control the overall operation of the memory controller 104.

For example, the memory management circuit 202 executes the file management mechanism as illustrated in FIG. 2 and FIG. 3.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit.

In another exemplary embodiment of the present invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a boot code segment. When the memory controller 104 is enabled, the microprocessor unit first executes the boot code segment to load the control instructions that are stored in the rewritable non-volatile memory module 106 into the RAM of the memory management circuit 202. Thereafter, the microprocessor unit runs the control instructions.

Moreover, in yet another exemplary embodiment of the present invention, the control instructions of the memory management circuit 202 may also be implemented in a hardware form. For example, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical blocks of the rewritable non-volatile memory module 106. The memory writing circuit is configured to give a write command to the rewritable non-volatile memory module 106 to write data into the rewritable non-volatile memory module 106. The memory reading circuit is configured to give a read command to the rewritable non-volatile memory module 106 to read data from the rewritable non-volatile memory module 106. The memory erasing circuit is configured to give an erase command to the rewritable non-volatile memory module 106 to erase data from the rewritable non-volatile memory module 106. The data processing circuit is configured to process data to be written into and read from the rewritable non-volatile memory module 106.

The host interface 204 is coupled to the memory management circuit 202 and configured to receive and identify commands and data transmitted from the host system 1000. Namely, commands and data transmitted by the host system 1000 are transmitted to the memory management circuit 202 through the host interface 204. In the present exemplary embodiment, the host interface 204 complies with the USB standard. However, it should be noted that the invention is not limited thereto, and the host interface 204 may also comply with the MS standard, the MMC standard, the CF standard, the PATA standard, the IEEE 1394 standard, the PCI express standard, the SATA standard, the SD standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The buffer memory 208 is coupled to the memory management circuit 202 and configured to temporarily store data and commands from the host system 1000 or data from the rewritable non-volatile memory module 106.

The power management circuit 210 is coupled to the memory management circuit 202 and configured to control the power supply of the memory storage apparatus 100.

The ECC circuit 212 is coupled to the memory management circuit 202 and configured to perform an ECC procedure to ensure data accuracy. To be specific, when the memory management circuit 202 receives a write command from the host system 1000, the ECC circuit 212 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 212 performs the ECC procedure on the data according to the ECC code.

Figure 7:
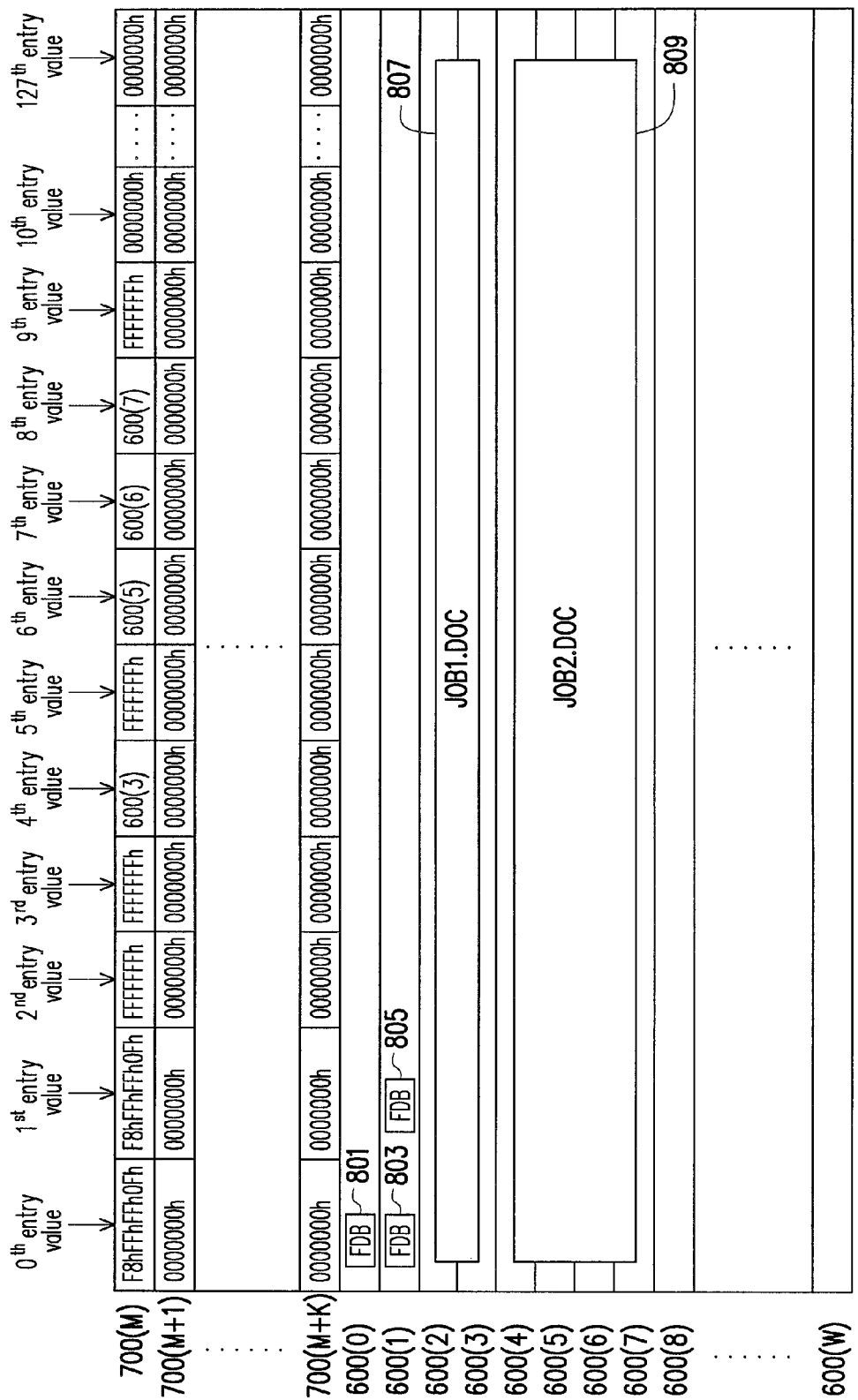
FIG. 7 is a schematic diagram of storing a file in a memory storage apparatus according to an exemplary embodiment.

FIG. 7 is a schematic diagram of storing a file in a memory storage apparatus according to an exemplary embodiment.

Referring to FIG. 7, it is assumed here that the user creates a sub-directory named 'JOB' in the memory storage apparatus 100 through the OS 1110 and stores two files, 807 and 809, which are respectively named 'JOB1.DOC' and 'JOB2.DOC' in the sub-directory named 'JOB', wherein two clusters are required for the file 807 named 'JOB1.DOC', and four clusters are required for the file 809 named 'JOB2.DOC.'

For the sub-directory, the OS 1110 records the file description block 801 corresponding to the sub-directory named 'JOB' in an unused address of the cluster (for example, the cluster 600(0)) allocated to the root directory area 906 and searches for a blank cluster (for example, the cluster 600(1)) to record the file content regarding the sub-directory according to the file system in the memory storage apparatus 100, wherein the information of the cluster 600(1) is recorded in the file description block 801.

For the files, the OS 1110 searches for two blank clusters (for example, the clusters 600(2) and 600(3)) for storing the content of the file 807 according to the file system in the memory storage apparatus 100 and the size of the file 807. Moreover, the OS 1110 records the file description block 803 corresponding to the file 807 in the cluster 600(1), modifies the entry value (i.e. the fourth entry value) corresponding to the cluster 600(2) as the address of the cluster 600(3) and modifies the entry value (i.e. the fifth entry value) corresponding to the 600(3) as "FFFFFFFFh" in the file allocation document 950 of the file allocation document area 904. Similarly, according to the file system in the memory storage apparatus 100 and the size of the file 809, the OS 1110 finds four blank clusters (e.g. the clusters 600(4), 600(5), 600(6) and 600(7)) for storing the content of the file 809. Moreover, the OS 1110 records the file description block 805 corresponding to the file 809 in the cluster 600(1), modifies the entry value (i.e. the sixth entry value) corresponding to the cluster 600(4) as the address of the cluster 600(5), modifies the entry value (i.e. the seventh entry value) corresponding to the cluster 600(5) as the address of the cluster 600(6), modifies the entry value (i.e. the eighth entry value) corresponding to the cluster 600(6) as the address of the cluster 600(7), and modifies the entry value (i.e. the ninth entry value) corresponding to the cluster 600(7) as FFFFFFFFh" in the file allocation document 950 of the file allocation document area 904. For example, after completing the above steps, the host system 1000 identifies that there is a sub-directory named 'JOB' stored in the memory storage apparatus 100 according to the file description blocks in the root directory area 906. Additionally, the host system 1000 identifies that there are a file 807 named 'JOB1.DOC' and a file 809 named 'JOB2.DOC' stored in the memory storage apparatus 100, and these files are located under the sub-directory named 'JOB' according to the file description blocks stored in the cluster 600(1) recorded in file description blocks of the sub-directory. For example, when the host system 1000 is about to read the file 807 named 'JOB1.DOC', the OS 1110 starts to read data according to the cluster 600(2) recorded in the file description block 803 corresponding to the file, continues to read data from the cluster 600(3) according to the entry value corresponding to the cluster 600(2) in the file allocation document area 904, and accordingly, the reading operation of the file is completed.

In the present exemplary embodiment, in order to prevent the files stored in the memory storage apparatus 100 to be accessed by another person, the user may use the file protecting application 1120 to instruct the memory controller (or the memory management circuit 202) to perform the file protection enabling procedure on the files to be protected. For example, when the file protecting application 1120 transmits the file protection enabling signal instructing to perform the file protection enabling procedure on a file to the memory storage apparatus 100, the memory controller 104 (or the memory management circuit 202) generates a entry value backup according to the entry value corresponding the cluster storing the file, which is recorded in the file allocation document 950, stores the generated entry value backup in the secure storage area and changes at least one entry value corresponding to the cluster used for storing the file in the file allocation document 950. Accordingly, the host system 1000 cannot read the file according to the changed entry value so as to achieve file protection.

Hereinafter, several examples will be illustrated to describe how the memory controller 104 (or the memory management circuit 202) changes the entry value corresponding to the cluster used for storing the file to achieve file protection.

Figures 8A, 8B:
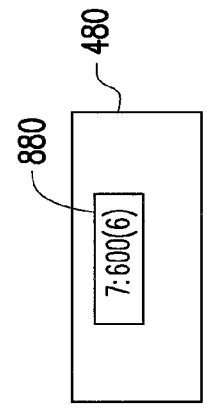
FIG. 8A and FIG. 8B illustrate an example of modifying a file allocation document according to an exemplary embodiment of the present invention.

FIG. 8A and FIG. 8B illustrate an example of modifying a file allocation document according to an exemplary embodiment of the present invention.

Referring to FIG. 8A and FIG. 8B, given that the user would like to protect the file 809 named "JOB2.DOC" (as shown in FIG. 7) and sends the file protection enabling signal instructing to perform the file protection enabling procedure on the file 809 to the memory storage apparatus 100. In this example, when receiving the file protection enabling signal instructing to perform the file protection enabling procedure on the file 809, the memory controller 104 (or the memory management circuit 202) generates an entry value backup 880 according to the entry value (i.e. the seventh entry value) corresponding the second cluster (i.e. the cluster 600(5) storing the file 809 in the file allocation document 950 and stores the generated entry value backup 880 in a hidden area 480, wherein the seventh entry value is recorded as 600(6) in the entry value backup 880. Then, the memory controller 104 (or the memory management circuit 202) modifies the entry value (i.e. the seventh entry value) corresponding to the cluster 600(5) in the file allocation document 950 as a value (i.e. 600(5)) representing its address. Accordingly, link information between the clusters for storing the file 809 is destroyed, and thus, the host system 1000 can no longer read the file 809 according to the information recorded in the file allocation document 950. For example, after starting to read data from the cluster 600(4) according to the file description block 805 and then continuing to read data from the cluster 600(5) according to the entry value (i.e. the sixth entry value) in the file allocation document 950, the host system 1000 identifies that the next cluster is the cluster 600(5) according to the entry value (i.e. the seventh entry value) corresponding to the cluster 600(5), which results in a file read failure due to a conflict occurring. It should be mentioned that even though in the example illustrated in FIG. 8, it takes modifying the second cluster as an example for description, the present invention is not limited thereto. In another exemplary embodiment of the present invention, the entry value corresponding to any one or more clusters among the clusters used for storing the file may be modified as a value representing its address or any other file address to destroy the link between the clusters storing the file so that the file cannot be correctly read, that is, the file read failure occurs or an incorrect file is read.

Figures 9A, 9B:
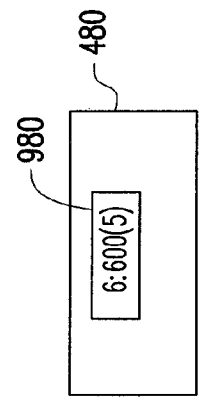
FIG. 9A and FIG. 9B illustrate another example of modifying a file allocation document according to an exemplary embodiment of the present invention.

FIG. 9A and FIG. 9B illustrate another example of modifying a file allocation document according to an exemplary embodiment of the present invention.

Referring to FIG. 9A and FIG. 9B, given that the user would like to protect the file 809 named "JOB2.DOC" (as shown in FIG. 7) and sends the file protection enabling signal instructing to perform the file protection enabling procedure on the file 809 to the memory storage apparatus 100. In this example, when receiving the file protection enabling signal instructing to perform the file protection enabling procedure on the file 809, the memory controller 104 (or the memory management circuit 202) generates an entry value backup 980 according to the entry value (i.e. the sixth entry value) corresponding the first cluster (i.e. the cluster 600(4)) storing the file 809 in the file allocation document 950 and stores the generated entry value backup 980 in the hidden area 480, wherein the sixth entry value is recorded as 600(5) in the entry value backup 980. Then, the memory controller 104 (or the memory management circuit 202) modifies the entry value (i.e. the sixth entry value) corresponding to the cluster 600(4) in the file allocation document 950 as a value (i.e. an end mark, e.g. "FFFFFFFh") representing the last cluster storing the file. Accordingly, the link information between the clusters for storing the file 809 is destroyed, and thus, the host system 1000 can no longer read the file 809 according to the information recorded in the file allocation document 950. For example, after starting to read data from the cluster 600(4) according to the file description block 805, the host system 1000 identifies that the cluster 600(4) is the last cluster according to the entry value (i.e. the sixth entry value) corresponding to the cluster 600(4), so that the sequential data cannot be continuously read, which results in the file read failure. It should be mentioned that even though in the example illustrated in FIG. 9B, it takes modifying the first cluster as an example for description; the present invention is not limited thereto. In another exemplary embodiment of the present invention, the entry value corresponding to any one or plural clusters among the clusters used for storing the file may be modified as a value representing the end mark so that the host system 1000 cannot continue to read the data, which results in the file read failure.

FIG. 10A and FIG. 10B illustrate still another example of modifying a file allocation document according to an exemplary embodiment of the present invention.

Referring to FIG. 10A and FIG. 10B, given that the user would like to protect the file 809 named "JOB2.DOC" (as shown in FIG. 7) and sends the file protection enabling signal instructing to perform the file protection enabling procedure on the file 809 to the memory storage apparatus 100. In this example, when receiving the file protection enabling signal instructing to perform the file protection enabling procedure on the file 809, the memory controller 104 (or the memory management circuit 202) generates the entry value backup 980 according to the entry value (i.e. the sixth entry value) corresponding the first cluster (i.e. the cluster 600(4)) storing the file 809 in the file allocation document 950 and stores the generated entry value backup 980 in the hidden area 480, wherein the sixth entry value is recorded as 600(5) in the entry value backup 980. Then, the memory controller 104 (or the memory management circuit 202) modifies the entry value (i.e. the sixth entry value) corresponding to the cluster 600(4) in the file allocation document 950 as a value (e.g. "FFFFFF7h") representing that the cluster is a bad cluster. Accordingly, when starting to read data from the cluster 600(4) according to the file description block 805, the host system 1000 identifies that the cluster used for storing the file 809 is damaged, which results in the file read failure.

Figure 11B:
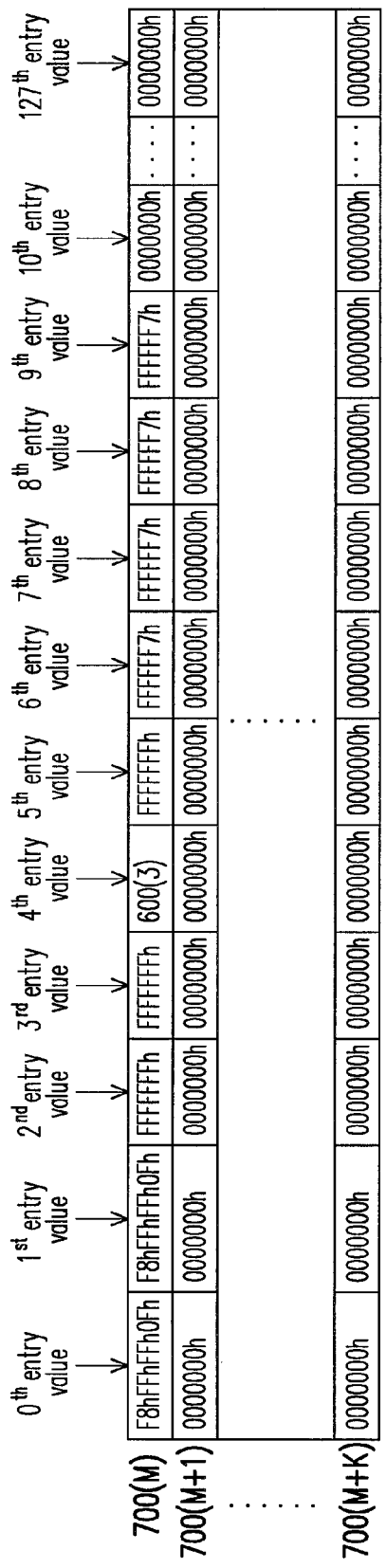
FIG. 11A and FIG. 11B illustrate yet another example of modifying a file allocation document according to an exemplary embodiment of the present invention.
Figure 11A:
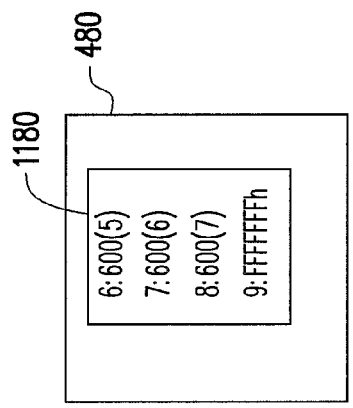

FIG. 11A and FIG. 11B illustrate yet another example of modifying a file allocation document according to an exemplary embodiment of the present invention.

Referring to FIG. 11A and FIG. 11B, given that the user would like to protect the file 809 named "JOB2.DOC" (as shown in FIG. 7) and sends the file protection enabling signal instructing to perform the file protection enabling procedure on the file 809 to the memory storage apparatus 100. In this example, when receiving the file protection enabling signal instructing to perform the file protection enabling procedure on the file 809, the memory controller 104 (or the memory management circuit 202) generates the entry value backup 980 according to the entry value (i.e. the sixth entry value) corresponding the first cluster (i.e. the cluster 600(4)) storing the file 809 in the file allocation document 950 and stores the generated entry value backup 980 in the hidden area 480, wherein the sixth entry value is recorded as 600(5) in the entry value backup 980. Then, the memory controller 104 (or the memory management circuit 202) modifies the entry value (i.e. the sixth entry value) corresponding to all the clusters used for storing the file 809 in the file allocation document 950 as a value (e.g. "FFFFFF7h") representing that the cluster is a bad cluster. For example, the memory controller 104 (or the memory management circuit 202) modifies the entry value (i.e. the sixth entry value) corresponding to the cluster 600(4) as "FFFFFF7h", modifies the entry value (i.e. the seventh entry value) corresponding to the cluster 600(5) as "FFFFFF7h", modifies the entry value (i.e. the eighth entry value) corresponding to the cluster 600(6) as "FFFFFF7h" and modifies the entry value (i.e. the ninth entry value) corresponding to the cluster 600(7) as "FFFFFF7h". Accordingly, when starting to read data from the cluster 600(4) according to the file description block 805, the host system 1000 identifies that the cluster used for storing the file 809 is damaged, which results in the file read failure.

It should be understood that in the examples illustrated in FIG. 10B and FIG. 11B, the file read failure, i.e. the file failed to be correctly read, is achieved by modifying the entry value corresponding to the first cluster among the clusters used for storing the file or modifying the entry value corresponding to all the clusters used for storing the file as the value representing that the cluster is a bad cluster. However, the present invention is not limited thereto, and in another embodiment, the entry value corresponding to any one or plural clusters among the clusters storing the file may be modified as the value representing that the cluster is a bad cluster so as to result in the file read failure in the host system 1000. Further, it should be mentioned that in the example illustrated in FIG. 11A and FIG. 11B, it is assumed that a number of the clusters used for storing the file 809 is plural, but the present invention is not limited thereto. The number of the clusters used for storing the file 809 may also be only one, and when performing the file protection enabling procedure, the entry value corresponding to the cluster may be modified as the value representing that the cluster is a bad cluster.

It should noted that the modification mechanisms illustrated in FIG. 8B, FIG. 9B, FIG. 10B and FIG. 11B do not construct limitations to the present invention, and the memory controller 104 (or the memory management circuit 202) can selectively perform at least part of the modification mechanisms to achieve file protection.

Accordingly, in the present exemplary embodiment, the memory controller 104 (or the memory management circuit 202) configures the disposed hidden area 408 as the secure storage area used for storing the entry value backup. However, it should be understood that the present invention is not limited thereto. In another exemplary embodiment, a storage element (e.g. a rewritable non-volatile memory) is additionally disposed in the memory storage apparatus 100 and configured as the secure storage area used for storing the entry value backup.

Particularly, after performing the file protection enabling procedure, the user may disable the file protection mechanism through the file protecting application 1120 when the protected file is about to be accessed. For example, after identification of the user identity is completed, the file protecting application 1120 sends the file protection disabling signal to the memory storage apparatus 100, and the memory controller 104 (or the memory management circuit 202) restores (recover) the entry value modified via the file protection enabling procedure according to the entry value backup stored in the secure storage area. Herein, the user identity is identified via a password, a biometrical feature or any other identification mechanism, and the present exemplary embodiment is not intent to limit this.

For example, in the example illustrated in FIG. 8A and FIG. 8B, when receiving the file protection disabling signal instructing to perform the file protection disabling procedure on the file 809, the memory controller 104 (or the memory management circuit 202) restores the entry value (i.e. the seventh entry value) corresponding to the second cluster storing the file 809 in the file allocation document 950 to 600(6). Accordingly, the host system 1000 can then read the file 809 according to the restored file allocation document 950.

Figure 12A:
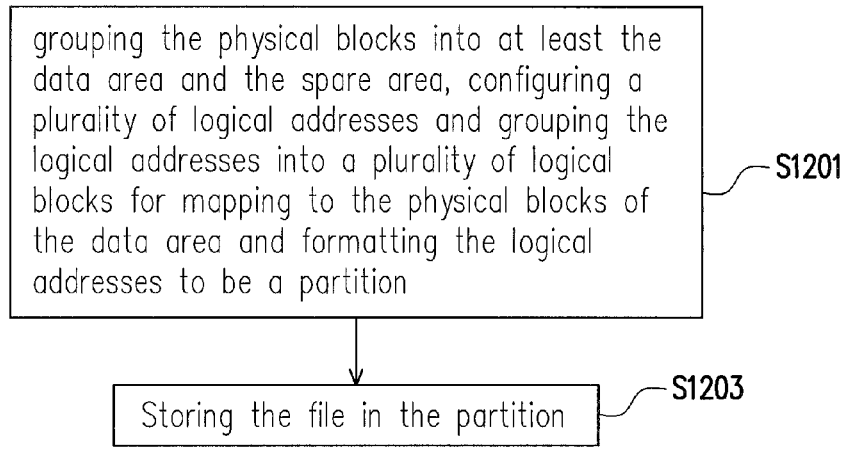
FIG. 12A and FIG. 12B are flowcharts illustrating a file protecting method according to an exemplary embodiment of the present invention.
Figure 12B:
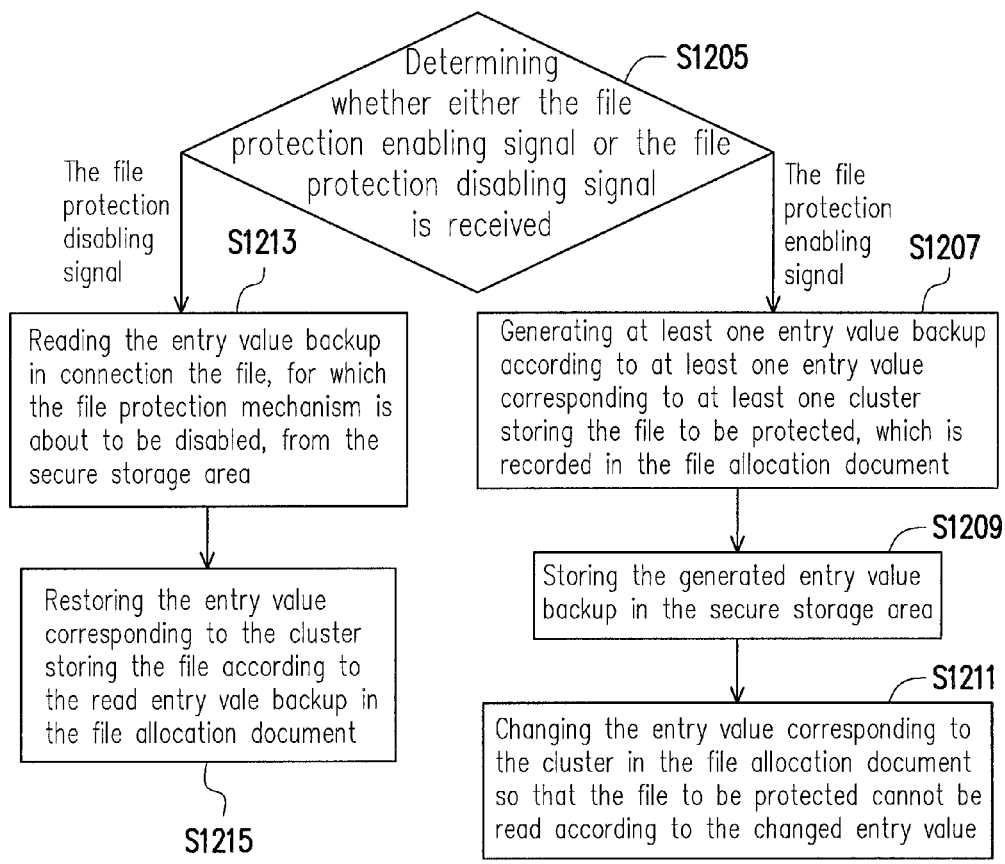

FIG. 12A and FIG. 12B are flowcharts illustrating a file protecting method according to an exemplary embodiment of the present invention.

Referring to FOG. 12A, in step S1201, the physical blocks of the rewritable non-volatile memory module 106 are grouped into at least the data area 402 and the spare area 404, a plurality of logical addresses is configured and grouped into a plurality of logical blocks to be mapped to the physical blocks of the data area 402, and the logical addresses are formatted to be a partition. For example, as described above, the partition includes the file allocation document area 904, the root directory area 906 and the file area 908.

In step S1203, a file is stored in the partition. In particular, in step S1203, the content of the file is stored in the file area 908, the file description blocks corresponding to the file are stored in the root directory area 906, and the entry value corresponding to the clusters used for storing the file is recorded in the file allocation document 950 of the file allocation document area 904. Besides, in step S1203, the memory controller 104 (or the memory management circuit 202) writes the data stored into the file allocation document area 904, the root directory area 906 and the file area 908 into the corresponding physical blocks based on a logical block-physical block mapping table.

Referring to FIG. 12B, in step S1205, whether either the file protection enabling signal or the file protection disabling signal is received is determined.

If the file protection enabling signal is received, in step S1207, the memory controller 104 (or the memory management circuit 202) generates at least one entry value backup according to at least one entry value corresponding to at least one cluster storing the file to be protected, which is recorded in the file allocation document 950. Then, in step S1209, the memory controller 104 (or the memory management circuit 202) stores the generated entry value backup in the secure storage area. Finally, in step S1211, the memory controller 104 (or the memory management circuit 202) changes the entry value corresponding to the cluster in the file allocation document 950 so that the file to be protected cannot be read according to the changed entry value. The mechanisms of changing the entry value have been described with reference to FIG. 8B, FIG. 9B, FIG. 10B and FIG. 11B in the above, and will not repeated hereinafter.

If the file protection disabling signal is received, in step S1213, the memory controller 104 (or the memory management circuit 202) reads the entry value backup in connection the file, for which the file protection mechanism is about to be disabled, from the secure storage area. Afterward, in step 1215, the memory controller 104 (or the memory management circuit 202) restores the entry value corresponding to the cluster used for storing the file according to the read entry vale backup in the file allocation document 950. Thus, the file previously protected can be accessed again.

It should be mentioned that in the aforementioned exemplary embodiment, the file protection enabling procedure and the file protection disabling procedure are performed by the memory controller 104 (or the memory management circuit 202) according to the signal sent from the file protecting application 1102. However, the present invention is not limited thereto. For example, in another exemplary embodiment of the present invention, a file protecting system may include a memory storage apparatus and a file protecting application, and the file protection enabling procedure and the file protection disabling procedure are performed by the file protecting application.

Based on the above, the file protecting method and system, the memory controller and the memory management circuit using the method according to the exemplary embodiments of the present invention can protect the stored file from being accessed by an unauthorized person so that the security of the stored file can be ensured. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A file protecting method for a memory storage apparatus having a re-writable non-volatile memory module having a plurality of physical blocks, the file protecting method comprising:

grouping the plurality of physical blocks into at least a data area and a spare area;

configuring a plurality of logical addresses and grouping the plurality of logical addresses into a plurality of logical blocks to be mapped to the plurality of physical blocks of the data area, wherein the plurality of logical addresses is formatted to be a partition having a file allocation document area and a file area, the file allocation document area stores a file allocation document, a file is stored in at least one cluster in the file area, and the file allocation document records at least one entry value corresponding to the at least one cluster; and performing a file protection enabling procedure on the file, wherein the file protection enabling procedure comprises:
generating an entry value backup according to the at least one entry value corresponding to the at least one cluster, which is recorded in the file allocation document;
storing the entry value backup in a secure storage area; and
changing the at least one entry value corresponding to the at least one cluster in the file allocation document, wherein the file cannot be correctly read according to the at least one changed entry value.

2. The file protecting method as recited in claim 1, further comprising:
performing a file protection disabling procedure on the file, wherein the file protection disabling procedure comprises:
reading the entry value backup from the secure storage area; and
restoring the at least one entry value corresponding to the at least one cluster storing the file according to the entry value backup in the file allocation document.

3. The file protecting method as recited in claim 1, wherein the number of the at least one cluster storing the file in the file area is one, and the step of changing the at least one entry value corresponding to the at least one cluster in the file allocation document comprises:
modifying an entry value corresponding to the cluster storing the file as a value representing a bad cluster in the file allocation document.

4. The file protecting method as recited in claim 1, wherein the number of the at least one cluster storing the file in the file area is plural, and the step of changing the at least one entry value corresponding to the at least one cluster in the file allocation document comprises:
modifying an entry value corresponding to one of the clusters storing the file as a value representing an address of the one of the clusters in the file allocation document.

5. The file protecting method as recited in claim 1, wherein the number of the at least one cluster storing the file in the file area is plural, and the step of changing the at least one entry value corresponding to the at least one cluster in the file allocation document comprises:
modifying at least one entry value corresponding to at least one cluster among the clusters storing the file as a value representing the bad cluster in the file allocation document.

6. The file protecting method as recited in claim 1, wherein the number of the at least one cluster storing the file in the file area is plural, and the step of changing the at least one entry value corresponding to the at least one cluster in the file allocation document comprises:
modifying at least one entry value corresponding to at least one cluster among the clusters storing the file as a value representing an end mark in the file allocation document, wherein the at least one cluster is not the last cluster storing the file.

7. The file protecting method as recited in claim 1, wherein the step of grouping the plurality of physical blocks into at least the data area and the spare area comprises:
grouping the plurality of physical blocks into at least the data area, the spare area and a hidden area and serving the hidden area as the secure storage area.

8. The file protecting method as recited in claim 1, further comprising:
operating a file protecting application in a host system and disposing a memory controller in the memory storage apparatus; and
transmitting a file protection enabling signal for the file via the file protecting application to the memory controller, and the memory controller performing the file protection enabling procedure in response to the file protection enabling signal.

9. The file protecting method as recited in claim 1, further comprising:
operating a file protecting application in a host system; and
performing the file protection enabling procedure via the file protecting application.

10. A memory controller for controlling a rewritable non-volatile memory module having a plurality of physical blocks, comprising:
a host interface, configured to be coupled to a host system;
a memory interface, configured to be coupled to the rewritable non-volatile memory module; and
a memory management circuit, coupled to the host interface and the memory interface,
wherein the memory management circuit is configured to group the plurality of physical blocks into at least a data area and a spare area, configure a plurality of logical addresses and group the plurality of logical addresses into a plurality of logical blocks for mapping to the plurality of physical blocks of the data area, wherein the plurality of logical addresses is at least formatted to be a partition having a file allocation document area and a file area, the file allocation document area stores a file allocation document, a file is stored in at least one cluster in the file area, and the file allocation document records at least one entry value corresponding to the at least one cluster, and
wherein the memory management circuit is configured to perform a file protection enabling procedure on the file to generate an entry value backup according to the at least one entry value corresponding to the at least cluster, which is recorded in the file allocation document, store the entry value backup to a secure storage area and change the at least one entry value corresponding to the at least one cluster in the file allocation document area, wherein the host system cannot correctly read the file according to the at least one changed entry value.

11. The memory controller as recited in claim 10, wherein the memory management circuit is configured to perform a file protection disabling procedure on the file to read the entry value backup from the secure storage area and restore the at least one entry value corresponding to the at least one cluster storing the file according to the entry value backup in the file allocation document.

12. The memory controller as recited in claim 10, wherein the number of the at least one cluster storing the file in the file area is one,
wherein the memory management circuit is further configured to modify an entry value corresponding to the cluster storing the file as a value representing a bad cluster in the file allocation document so as to change the entry value corresponding to the cluster storing the file.

13. The memory controller as recited in claim 10, wherein the number of the at least one cluster storing the file in the file area is plural,
wherein the memory management circuit is further configured to modify an entry value corresponding to one of the clusters storing the file as a value representing an address of the one of the clusters in the file allocation document so as to change the entry values corresponding to the clusters storing the file.

14. The memory controller as recited in claim 10, wherein the number of the at least one cluster storing the file in the file area is plural,
wherein the memory management circuit is further configured to modify at least one entry value corresponding to at least one cluster among the clusters storing the file as a value representing a bad cluster in the file allocation document so as to change the entry values corresponding to the clusters storing the file.

15. The memory controller as recited in claim 10, wherein the number of the at least one cluster storing the file in the file area is plural,
wherein the memory management circuit is further configured to modify at least one entry value corresponding to at least one cluster among the clusters storing the file as a value representing an end mark in the file allocation document so as to change the entry values corresponding to the clusters storing the file, wherein the at least one cluster is not the last cluster storing the file.

16. The memory controller as recited in claim 10, wherein the memory management circuit is further configured to group the plurality of physical blocks into at least the data area, the spare area and a hidden area and serves the hidden area as the secure storage area.

17. The memory controller as recited in claim 10, wherein the host system operates a file protecting application,
wherein when the file protecting application transmits a file protection enabling signal for the file to the memory management circuit, the memory management circuit is further configured to perform the file protection enabling procedure in response to the file protection enabling signal.

18. A memory storage apparatus, comprising:
a connector, configured to be coupled to a host system;
a rewritable non-volatile memory module, having a plurality of physical blocks; and
a memory controller, coupled to the connector and the rewritable non-volatile memory module,
wherein memory controller is configured to group the plurality of physical blocks into at least a data area and a spare area, configure a plurality of logical addresses and group the plurality of logical addresses into a plurality of logical blocks for mapping to the plurality of physical blocks, wherein the plurality of logical addresses is formatted to be a partition having a file allocation document area and a file area, the file allocation document area stores a file allocation document, a file is stored in at least one cluster in the file area, and the file allocation document records at least one entry value corresponding to the at least one cluster,
wherein the memory controller is further configured to perform a file protection enabling procedure on the file to generate an entry value backup according to the at least one entry value corresponding to the at least cluster in the file allocation document, store the entry value backup in a secure storage area and change the at least one entry value corresponding to the at least one cluster in the file allocation document, wherein the host system cannot correctly read the file according to the at least one changed entry value.

19. The memory storage apparatus as recited in claim 18, wherein the memory controller performs a file protection disabling procedure on the file to read the entry value backup from the secure storage area and restore the at least one entry value corresponding to the at least one cluster storing the file in the file allocation document according to the entry value backup.

20. The memory storage apparatus as recited in claim 18 wherein the number of the at least one cluster storing the file in the file area is one,
wherein the memory controller is further configured to modify an entry value corresponding to the cluster storing the file as a value representing a bad cluster in the file allocation document so as to change the entry value corresponding to the cluster storing the file.

21. The memory storage apparatus as recited in claim 18, wherein a number of the at least one cluster storing the file in the file area is plural,
wherein the memory controller is further configured to modify an entry value corresponding to one of the clusters storing the file as a value representing an address of the one of the clusters in the file allocation document so as to change the entry values corresponding to the clusters storing the file.

22. The memory storage apparatus as recited in claim 18, wherein the number of the at least one cluster storing the file in the file area is plural,
wherein the memory controller is further configured to modify at least one entry value corresponding to at least one cluster among the clusters storing the file as a value representing a bad cluster in the file allocation document so as to change the entry values corresponding to the clusters storing the file.

23. The memory storage apparatus as recited in claim 18, wherein the number of the at least one cluster storing the file in the file area is plural,
wherein the memory controller is further configured to modify an least one entry value corresponding to at least one cluster among the clusters storing the file as a value representing an end mark in the file allocation document so as to change the entry values corresponding to the clusters storing the file, wherein the at least one cluster is not the last cluster storing the file.

24. The memory storage apparatus as recited in claim 18, wherein the memory controller is further configured to group the plurality of physical blocks into at least the data area, the spare area and a hidden area and serves the hidden area as the secure storage area.

25. The memory storage apparatus as recited in claim 18, wherein the host system operates a file protecting application,
wherein when the file protecting application transmits a file protection enabling signal for the file to the memory controller, the memory controller is further configured to perform the file protection enabling procedure in response to the file protection enabling signal.

26. A data protecting system, comprising:
a memory storage apparatus, having a rewritable non-volatile memory module and a memory controller, wherein the rewritable non-volatile memory module has a plurality of physical blocks, and the memory controller is configured to group the plurality of physical blocks into at least a data area, a spare area and a secure storage area, configure a plurality of logical addresses and group the plurality of logical addresses into a plurality of logical blocks for mapping to the physical blocks of the data area, wherein the plurality of logical addresses is formatted to be a partition having a file allocation document area and a file area, the file allocation document area stores a file allocation document, a file is stored in at least one cluster in the file area, and the file allocation document records at least one entry value corresponding to the at least one cluster; and a file protecting application, operated in a host system, wherein the file protecting application is configured to perform a file protection enabling procedure for the file to generate an entry value backup according to the at least one entry value corresponding to the at least cluster in the file allocation document, instruct the memory controller to store the entry value backup in the hidden area and change the at least one entry value corresponding to the at least one cluster in the file allocation document, wherein the host system cannot correctly read the file according to the at least one changed entry value.

* * * * *